United States Patent
Yasuda et al.

(10) Patent No.: US 7,819,996 B2
(45) Date of Patent: Oct. 26, 2010

(54) METHOD OF MANUFACTURING CERAMIC SHEET AND METHOD OF MANUFACTURING GAS SENSING ELEMENT

(75) Inventors: Eturo Yasuda, Okazaki (JP); Noriaki Kihara, Okazaki (JP); Daisuke Makino, Ichinomiya (JP); Makoto Shirai, Hekinan (JP); Hirokatsu Mukai, Kuwana (JP); Takumi Ushikubo, Kuwana (JP)

(73) Assignees: Nippon Soken, Inc., Nishio, Aichi-Pref. (JP); Denso Corporation, Kariya, Aichi-Pref. (JP)

( * ) Notice: Subject to any disclaimer, the term of this patent is extended or adjusted under 35 U.S.C. 154(b) by 105 days.

(21) Appl. No.: 11/976,735

(22) Filed: Oct. 26, 2007

(65) Prior Publication Data

US 2008/0099126 A1     May 1, 2008

(30) Foreign Application Priority Data

Oct. 27, 2006    (JP)    .............................. 2006-292593
May 25, 2007    (JP)    .............................. 2007-138969
Sep. 18, 2007    (JP)    .............................. 2007-240881

(51) Int. Cl.
*C03B 29/00*     (2006.01)
*A61F 13/15*     (2006.01)
*B29C 65/00*     (2006.01)
*C04B 38/00*     (2006.01)

(52) U.S. Cl. .............. 156/89.12; 156/89.16; 156/89.17; 156/160; 156/277; 501/80

(58) Field of Classification Search .............. 156/89.11, 156/89.12; 204/424
See application file for complete search history.

(56) References Cited

U.S. PATENT DOCUMENTS 4,497,677 A * 2/1985 Sanada et al. ............ 156/89.12
6,544,467 B2 * 4/2003 Symons et al. .............. 264/618

(Continued)

FOREIGN PATENT DOCUMENTS

DE     19725948     12/1998

(Continued)

OTHER PUBLICATIONS

German Office Action dated Oct. 6, 2008 issued in counterpart German application No. 102007000590.5 with English translation.

*Primary Examiner*—Philip C Tucker
*Assistant Examiner*—Alex Efta
(74) *Attorney, Agent, or Firm*—Nixon & Vanderhye P.C.

(57) ABSTRACT

Methods of manufacturing a ceramic sheet and a gas sensing element are disclosed. At least ceramic powder, a binder and a plasticizer are blended and mixed in slurry. The slurry is formed into unfired green sheets, on which paste is printed. Each of the unfired green sheets has porosity greater than 5%. In the manufacturing methods, the unfired green sheets are pressurized with a pressure of 10 MPa at a temperature above 60° C., after which the paste is printed on surfaces of the unfired green sheets. In the method of manufacturing the gas sensing element, a shielding layer, a porous diffusion resistance layer and the unfired green sheets for a sensing layer, a reference gas airspace forming layer and a heating layer are stacked to form a stacked ceramic body, whish is fired to obtain the gas sensing element.

7 Claims, 8 Drawing Sheets

U.S. PATENT DOCUMENTS

| | | | |
|---|---|---|---|
| 6,780,267 B1 * | 8/2004 | Kuramitsu et al. | 156/89.12 |
| 6,787,014 B2 * | 9/2004 | Hasei et al. | 204/424 |
| 6,875,528 B1 * | 4/2005 | Nagai et al. | 428/701 |
| 2002/0094423 A1 * | 7/2002 | Ogura et al. | 428/210 |
| 2003/0205078 A1 * | 11/2003 | Hasei et al. | 73/23.31 |
| 2005/0274615 A1 * | 12/2005 | Naito et al. | 204/424 |
| 2007/0193883 A1 * | 8/2007 | Garzon et al. | 204/426 |

FOREIGN PATENT DOCUMENTS

| | | |
|---|---|---|
| DE | 10032333 | 1/2002 |
| DE | 10020545 | 11/2008 |
| JP | 2002-286680 | 10/2002 |

* cited by examiner

METHOD OF MANUFACTURING CERAMIC SHEET AND METHOD OF MANUFACTURING GAS SENSING ELEMENT

CROSS REFERENCE TO RELATED APPLICATIONS

This application is related to Japanese Patent Application Nos. 2006-292593, 2007-138969 and 2007-240881, filed on Oct. 27, 2006, May 25, 2007 and Sep. 18, 2007, respectively, the contents of which are hereby incorporated by reference.

BACKGROUND OF THE INVENTION

1. Technical Field of the Invention

The present invention relates to methods of manufacturing a ceramic sheet and, more particularly, to a method of manufacturing a ceramic sheet for use in a gas sensing element or the like.

2. Description of the Related Art

In the related art, an attempt has heretofore been made to provide

An attempt has heretofore been made to provide a method of manufacturing a stacked type gas sensing element for detecting a specified gas concentration in measuring gases in a manner as shown in FIG. 10A typically showing the related art disclosed in, for instance, Japanese Patent Application Publication No. 2002-286680.

As shown in FIG. 10A, raw materials are prepared using a ceramic powder, a binder 912, and a plasticizer 913 and mixed. The resulting mixture is then formed into unfired green sheets 90. Subsequently, an electrically conductive paste is printed on a surface 900 of each unfired green sheet 90 in one areas forming an electrode pattern and a heating pattern or the like. In addition, a ceramic insulating paste is printed on the surface 900 of the unfired green sheet 90 in the other areas thereof with no formation of the electrode pattern and the heating pattern in a reversed pattern opposite to the electrically conductive pattern. Then, a plurality of unfired green sheets 90, subjected to the printing processes mentioned above, are stacked to form a stacked ceramic body. Thereafter, the stacked ceramic body is fired, thereby obtaining a gas sensing element composed of the ceramic sheets in a stacked structure.

In recent years, the stacked type gas sensing eminent has been formed in a complicated structure. In a manufacturing process of such a stacked type gas sensing element, the number of times for the paste to be printed on the surface 900 of the unfired green sheet 90 has been increasing with an increase in the number of unfired green sheets 90 to be stacked. Therefore, the number of times for the unfired green sheet 90 to be dried after the paste has been printed has been increasing with the resultant consequence of a progressive increase in deformation of the unfired green sheet 90 during drying stages. That is, as the paste is printed on the unfired green sheet 90, the wetting and contraction occur on the unfired green sheet 90, causing a change to occur in dimension of the unfired green sheet 90 in a dried state.

Such a tendency seems to occur because of the reasons listed below.

That is, when the paste is printed on the unfired green sheet 90, the solvent present in the paste penetrates the unfired green sheet 90. This causes the solvent to dissolve the binder 912 contained in the unfired green sheet 90. Thus, ceramic particles 911 present in the ceramic powder move with respect to each other in a rearranged state, as shown in FIG. 10B, under which the unfired green sheet 90 is dried. As a result, the dimension of the unfired green sheet 90 is conceived to change after the drying step as shown in FIG. 10B.

To address such an issue, a measure has been taken in the related art to execute a method of selecting a solvent that is hard to cause the wetting and contraction of the unfired green sheet 90.

However, with such a method, there is a fear of a drop occurring in a thermal compression force between the unfired green sheets 90 with the resultant degradation in a bonding capability.

SUMMARY OF THE INVENTION

The present invention has been completed with a view to addressing the above issues and has an object to provide a method of manufacturing a ceramic sheet that can minimize a dimensional change with no need for selecting a solvent.

To achieve the above object, a first aspect of the present invention provides a method of manufacturing a ceramic sheet, comprising the steps of: blending at least a ceramic powder, a binder and a plasticizer to prepare a mixture of raw materials; mixing the raw materials; forming an unfired green sheet; and printing a paste on a surface of the unfired green sheet; wherein the unfired green sheet has a plurality of pores with a porosity greater than 5%.

With the method mentioned above, the unfired green sheet has the pores with porosity greater than 5%, enabling a reduction in change of the unfired green sheet in a dimension thereof. This seems to be based on two reasons as described below. That is, first, with the unfired green sheet having porosity greater than 5%, a solvent of the paste can rapidly escape to the outside through the pores formed inside the unfired green sheet, providing an ease of drying even if the solvent penetrates the inside of the unfired green sheet. This minimizes the binder and the plasticizer from dissolving due to the presence of the solvent. This results in a difficulty of causing a rearrangement of ceramic particles in the ceramic powder.

Second, there are conditions, under which the unfired green sheet has pores with porosity greater than 5%, which are considered to include three cases including: (1) a first case in which the ceramic particles have large particle diameter; (2) a second case in which the ceramic particles agglutinate; and (3) a third case in which the ceramic particles have complicated configurations. Under such conditions, in usual practice, the ceramic particles are arranged in a status with the particles agglutinating in a distance narrowed to some extent on a stage in which the unfired green sheet is formed. Therefore, even if the rearrangement occurs in the ceramic particles, the distance between the particles is hard to be narrowed. Thus, even if the binder or the like are dissolved due to the solvent, no dimensional change occurs in the unfired green sheet.

However, in a fourth case, the ceramic particles have a small average particle diameter with well-regulated shapes (in the form of, for instance, a contoured shape closer to spheres). In this case, the porosity becomes small on a stage of the unfired green sheet with the resultant ease of causing the rearrangement of the ceramic particles during the dissolving of the binder or the like. This results in a consequence of the unfired green sheet being dried and the rearrangement occurs in the ceramic particles, causing an increase in dimensional change.

As set forth above, with the unfired green sheet set to have a large porosity, that is, a porosity exceeding a value of 5%, no need arises for choosing a solvent, while making it possible to eliminate the occurrence of dimensional change in the unfired green sheet.

As set forth above, the present embodiment can provide a method of manufacturing a ceramic sheet with less variation in dimension with no need for preliminarily selecting a solvent.

A second aspect of the present invention provides a method of manufacturing a gas sensing element for detecting a specified gas concentration in measuring gases, comprising the steps of: preparing first to third unfired green sheets for a sensing layer, a reference gas airspace forming layer and a heating layer, respectively; pressuring the first to third unfired green sheets with a pressure of 10 MPa at a temperature above 60° C. such that each of the first to third unfired green sheets has a plurality of pores with a porosity greater than 5%; preparing the sensing layer by forming a measuring gas side electrode on one surface of the first unfired green sheet and forming a reference gas side electrode on the other surface of the first unfired green sheet; preparing the reference gas airspace forming layer using the second unfired green sheet; preparing the heating layer by forming a heating section on the third unfired green sheet at one surface thereof in face with the sensing layer; stacking a shielding layer, a porous diffusion resistance layer, the sensing layer, the reference gas airspace forming layer and the heating layer to form a stacked ceramic body; and firing the stacked ceramic body for thereby obtaining the gas sensing element.

With the method mentioned above, the unfired green sheet has the pores with porosity greater than 5%, enabling a reduction in change of the unfired green sheet in a dimension thereof. This seems to be based on two reasons as described below. That is, first, with the unfired green sheet having porosity greater than 5%, a solvent of the paste can rapidly escape to the outside through the pores formed inside the unfired green sheet, providing an ease of drying even if the solvent penetrates the inside of the unfired green sheet. This minimizes the binder and the plasticizer from dissolving due to the presence of the solvent. This results in a difficulty of causing a rearrangement of ceramic particles in the ceramic powder. Thus, the gas sensing element using such unfired green sheets can be manufactured in a structure with a lessened dimensional change.

DETAILED DESCRIPTION OF PREFERRED EMBODIMENTS

Figure 1:
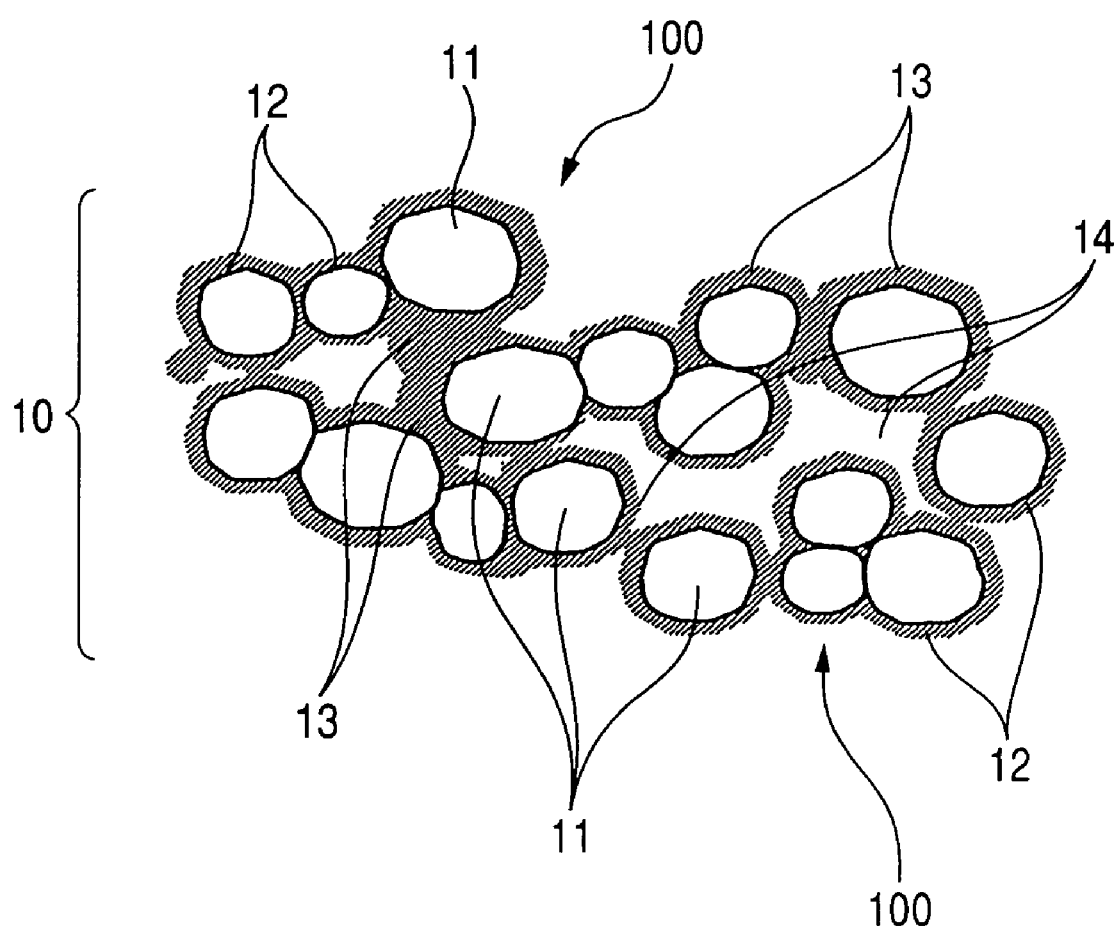
FIG. 1 is an enlarged illustrative view showing a state of an unfired green sheet prepared by a method of manufacturing a ceramic sheet of one aspect of the present invention.

Now, a method of manufacturing a ceramic sheet and a method of manufacturing a gas sensing element of first and second aspects of the present invention will be described below in detail with reference to various embodiments shown in the accompanying drawings. However, the present invention is construed not to be limited to such embodiments described below and technical concepts of the present invention may be implemented in combination with other known technologies or the other technology having functions equivalent to such known technologies.

(First Aspect of the Invention)

A method of manufacturing a ceramic sheet of a first aspect of the present invention comprises the steps of: blending at least a ceramic powder, a binder and a plasticizer to prepare a mixture of raw materials; mixing the raw materials; forming an unfired green sheet; and printing a paste on a surface of the unfired green sheet, wherein the unfired green sheet has a plurality of pores with a porosity greater than 5%.

In carrying out the method of the first aspect of the present invention, the ceramic material is prepared. Examples of the ceramic material include at least one element selected from the group consisting of, for instance, alumina, zirconia and titania or the like.

Although the binder may include various compounds with no particular limitation provided that these compounds can afford formability to the ceramic powder, a lipophilic binder may be preferably used. Examples of the lipophilic binder include, for instance, polyvinyl butyral resin and acryl resin or the like. Among these, polyvinyl butyral resin has a high chemical adsorbability to the ceramic powder with an increased sheet binding ability and increased thermally applicable range with a less incursion of impurities and, so, is preferably employed.

Further, the plasticizer may include various compounds with no particular limitation provided that these compounds can afford plasticity to the binder. In this case, examples of the plasticizer include, for instance, butyl benzyl phthalate (BBP), dibutyl phthalate (DBP), dioctylphthalate (DOP) and dibutyl sebacate (DBS), etc. Among these, especially, DBP and DOP have high vapor pressures with low volatilities and high boiling points and are preferably employed. In addition, the plasticizer may preferably contain 30 to 80% of the binder by mass thereof.

Moreover, in pressurizing the unfired green sheet, the unfired green sheet may preferably have a porosity greater than 5% on a stage before the pressurization step being conducted.

Further, the unfired green sheet may preferably have the porosity greater than 10%.

In this case, the unfired green sheet is able to eject the solvent to the outside at a further high speed to be easily dried. In addition, even if rearrangement occurs in ceramic grains, the grains can be kept in a distance that further becomes hard to thicken. This further prevents the occurrence of a dimensional change of the unfired green sheet.

Moreover, the unfired green sheet may preferably have the porosity greater than 15%.

In this case, the unfired green sheet is able to eject the solvent to the outside at a further high speed to be easily dried. In addition, even if rearrangement occurs in ceramic grains, the grains can be kept in a distance that further becomes hard to thicken. This further prevents the occurrence of a dimensional change of the unfired green sheet.

Further, the unfired green sheet may be preferably pressurized with a pressure greater than 10 MPa at a temperature higher than 60° C. after which the paste is printed on the surface of the unfired green sheet.

In this case, the unfired green sheet becomes hard in structure with an increased density. This makes it possible to further suppress the dimensional change of the ceramic grains due to rearrangement thereof. In addition, this results in an effect of suppressing the solvent in paste from penetrating the unfired green sheet.

Meanwhile, when the unfired green sheet is pressurized with a pressure less than 10 MPa at a temperature lower than 60° C., there is a fear of a difficulty arising in adequately obtaining an advantageous effect of the present invention.

Furthermore, the unfired green sheet may be preferably pressurized with a pressure greater than 10 MPa at a temperature higher than 60° C. after which the unfired green sheet has the porosity less than 7.5%.

In this case, the occurrence of a dimensional change of the unfired green sheet can be further minimized, making it possible to obtain a ceramic sheet with a further increased dimensional precision.

Meanwhile, if the unfired green sheet, subjected to the pressurizing step, has the porosity exceeding 7.5%, a firing shrinkage factor increases with a resultant drop in dimensional precision of the ceramic sheet, causing a fear to occur with a difficulty of fabricating a dense ceramic sheet.

Further, the ceramic sheet may preferably form a part of a gas sensing element for detecting a specified gas concentration in measuring gases.

In this case, the gas sensing element includes the ceramic sheet with a high dimensional precision, making it possible to provide a gas sensing element with increased reliability.

Furthermore, the unfired green sheet may preferably have a dimensional change less than that of an unfired green sheet, whose porosity lies at a value less than 5%, on a stage before and after the paste is repeatedly printed on the surface and then dried multiple times.

In this case, even if the paste is repeatedly printed on the surface and then dried multiple times, the dimensional change of the unfired green sheet can be adequately minimized, resulting in a capability of obtaining a ceramic sheet with further increased dimensional precision.

Embodiment

A method of manufacturing the ceramic sheet of the first aspect of the present invention will be described below with reference to Example shown in FIGS. 1 and 2 of the accompanying drawings.

As shown in FIG. 1, in carrying out the method of manufacturing the ceramic sheet of the first aspect of the present invention, a mixture of raw materials is prepared by blending a ceramic powder composed of ceramic particles 11, a binder 12 and a plasticizer 13 in given blending ratios. The resulting raw materials are mixed in slurry. The resulting slurry is then formed in an unfired green sheet 10. Subsequently, a paste is printed on a surface 100 of the unfired green sheet 10. In addition, the unfired green sheet 10 may preferably contain dispersant or the like.

The unfired green sheet 10 has pores 14 with porosity of a value of 5%.

The porosity of the unfired green sheet 10 is calculated in a manner described below. That is, first, a sum of a volume of organic matters, such as a binder or the like, and a volume of ceramic powder is obtained. Then, dividing the sum of these volumes by an entire volume of the unfired green sheet 10 allows a related proportion to be obtained representing a substantial volume ratio. Thereafter, the substantial volume ratio is subtracted from a value of 100%, thereby deriving porosity.

Accordingly, with the substantial volume ratio being less than 95%, porosity becomes more than 5%.

With the present example, further, the unfired green sheet 10 has a structure that has a dimensional change made less than that of an unfired green sheet, formed with pores with porosity less than 5%, before and after the paste is repeatedly printed on the surface 100 of the unfired green sheet 10 and dried multiple times.

Figure 2:
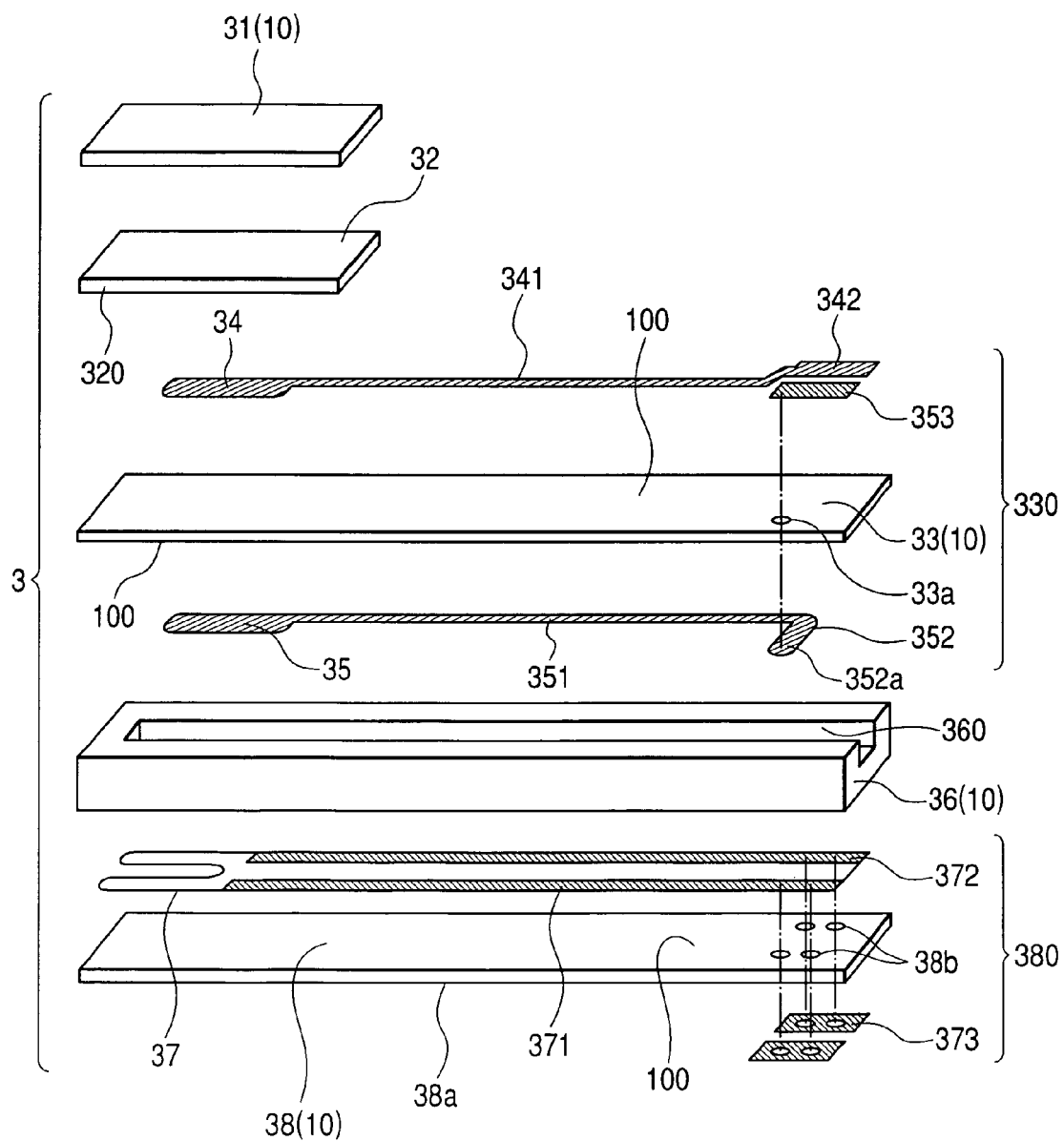
FIG. 2 is a perspective exploded view showing a gas sensing element manufactured by a method of manufacturing a gas ensign element of another aspect of the present invention.

With the present example, further, ceramic sheets 1, manufactured in the manufacturing method set forth above, are used for forming a part of a gas sensing element 3 for detecting a specified gas concentration in measuring gases as shown in FIG. 2.

Now, a method of manufacturing the ceramic sheet 1 and the gas sensing element 3 employing the ceramic sheet 1 will be described below.

The gas sensing element 3, manufactured according to the present invention, may operate as, for instance, an A/F sensing element, an $O_2$ sensing element and a NOx sensing element.

As shown in FIG. 2, the gas sensing element 3 includes a sensing layer 330 that is comprised of a solid electrolyte body 33 having oxygen ion conductivity, a measuring gas side electrode 34 formed on one surface of the solid electrolyte body 33, and a reference gas side electrode 35 formed on the other surface of the solid electrolyte body 33.

As shown in FIG. 2, the measuring gas side electrode 34 has one end formed with a longitudinally extending lead portion 341, which has a distal end formed with a terminal portion 342 at a position in opposition to the measuring gas side electrode 34 for outputting an output current to the outside.

Further, like the measuring gas side electrode 34, the reference gas side electrode 35 has one end formed with a longitudinally extending lead portion 351, which has a distal end formed with a laterally extending terminal portion 352 at a position in opposition to the reference gas side electrode 35. The terminal portion 352 has a lateral distal end 352a electrically connected to the terminal portion 353, formed on the one surface of the solid electrolyte body 33 in a position adjacent to the terminal portion 342, via an electrically conductive element (not shown) extending through a hole 33a formed in the solid electrolyte body 33.

As shown in FIG. 2, further, a reference gas airspace forming layer 36 is stacked on the solid electrolyte body 33 at the other surface thereof so as to cover the reference gas side electrode 35. The reference gas airspace forming layer 36 has one surface, facing the other surface of the solid electrolyte body 33, which is formed with a recessed portion 360. The recessed portion 360 longitudinally extends for defining a reference gas airspace under a status surrounded with the reference gas airspace forming layer 36 and the solid electrolyte body 33. This allows the reference gas side electrode 35 to be exposed to the reference gas airspace, thereby enabling atmospheric air as reference gas to be introduced to the reference gas airspace.

As shown in FIG. 2, furthermore, the reference gas airspace forming layer 36 has the other surface, in opposition to the surface facing the reference gas side electrode 35, on which a heating layer 380 is laminated. The heating layer 380 is comprised of a heating section 37 operative to develop a heat when applied with electric power, a pair of lead portions 371 for supplying electric power to the heating section 37, a pair of terminal portions 372 connected to the lead portions 371, respectively, and a heater substrate 38 for supporting these component parts.

As shown in FIG. 2, moreover, the heater substrate 38 has a bottom surface 38a, placed in opposition to the heating section 37 and the pair of lead portions 371, which is formed with a pair of laterally spaced terminal portions 373. The terminal portions 373 are electrically connected to the pair of terminal portions 372, provided on the one surface of the heater substrate 38, via a plurality of electrically conductive materials vertically extending through a plurality of holes 38b formed in the heater substrate 38.

In addition, as shown in FIG. 2, a porous diffusion resistance layer 32 is stacked on the one surface of the solid electrolyte body 33 so as to cover the measuring gas side electrode 34. Moreover, a shielding layer 31 is stacked on the porous diffusion resistance layer 32 so as to cover the same.

The porous diffusion resistance layer 32 is made of porous material with gas permeability. In addition, as shown in FIG. 2, the porous diffusion resistance layer 32 has a sidewall 320 configured in a structure to introduce measuring gases to the measuring gas side electrode 34 through the sidewall 320.

(Second Aspect of the Invention)

Now, a method of manufacturing the gas sensing element 3 of a second aspect of the present invention will be described below in detail with reference to FIG. 2.

With the method of manufacturing the gas sensing element 3 of the second aspect of the present invention, first, as shown in FIG. 2, the unfired sheets 10 are fabricated for forming thereon the porous diffusion resistance layer 32 and the reference gas airspace forming layer 36, respectively. Subsequently, the associated component parts, described above, are stacked on the unfired sheets 10 to form a stacked ceramic body with the unfired sheets 10 left unfired. Thereafter, the stacked ceramic body is fired, thereby obtaining the gas sensing element 3.

First, description is made of how the heating layer 380 is formed.

For instance, 12 g of butyral resin serving as the binder 12, 9 g of butyl benzyl phthalate serving as the plasticizer 13, 2 g of sorbitan trioleate as the dispersant, and a mixed solvent composed of a given amount of ethanol, 2-butanol and isoamyl acetate are added to 100 g of an alumina powder serving as the ceramic powder. Then, the resulting mixture is wet blended, thereby preparing a slurry. By using this slurry, the unfired green sheet 10 is fabricated for the heater substrate 38 by, for instance, a doctor blade method. In addition, the unfired green sheet 10 is formed in a structure with porosity greater than 5%. Also, the unfired green sheet 10 may be preferably structured to have porosity greater than 10% and, more preferably, 15%.

Next, the unfired green sheet 10 is pressurized under a pressure greater than 10 MPa at a temperature above 60° C.

The pressurization may be performed using, for instance, a WIP (Warm Isostatic Press) device. In an alternative, the unfired green sheet 10 may be placed in a die, after which the unfired green sheet 10 is pressed with a pressing machine.

Then, the unfired green sheet 10 for the heater substrate 38 has porosity less than 7.5% when subjected to the pressurization performed under the condition set forth above.

Thereafter, electrically conductive paste layers are printed on the surfaces 100 of the unfired green sheet 10 for the heater substrate 38 to form the heating section 37, the lead portions 371 and the terminal portions 372, 373, respectively.

Further, an insulating paste layer is formed on the one surface 100 of the unfired green sheet 10 for the heater substrate 38 by printing a reverse pattern in an area where no conductive paste layer for the heating section 37 is present. This results in capability of eliminating a difference in level on the one surface 100 of the unfired green sheet 10 with respect to the conductive paste layer for the heating section 37. Subsequently, the unfired green sheet 10 is dried.

Furthermore, examples of electrically conductive paste forming the heating section 37 may include a first raw material containing, for instance, 1.8 g of alumina powder and 15 g of platinum and a given amount of a second raw material containing a binder and a solvent or the like. The resulting raw materials are then mixed in a paste.

Moreover, examples of electrically conductive paste forming the terminal portions 372, 373 may include a raw material containing, for instance, 1 g of alumina powder and 15 g of platinum, and a given amount of a second raw material containing a binder and a solvent or the like. The resulting raw materials are then mixed in a paste.

Next, a method of forming the reference gas airspace forming layer 36 will be described below.

A plurality of unfired green sheets 10 for the reference gas airspace forming layer 36 are prepared in the same method and raw materials as those used for preparing the unfired green sheet 10 for the heater substrate 38. In this case, the plurality of unfired green sheets 10 are stacked into a stacked body to form the reference gas airspace forming layer 36. In an alternative, the reference gas airspace forming layer 36 may be structured using a single sheet of unfired green sheet 10 with a large thickness.

Next, a method of preparing the sensing layer 330 will be described below.

In preparing the solid electrolyte body 33, a slurry may be employed by preparing 100 g of a zirconium powder added admixed with a blend of 7 g of butyral resin serving as the binder 12, 5 g of butyl benzyl phthalate serving as the plasticizer 13 and a given amount of a mixed solvent containing ethanol, 2-butanol and isoamyl acetate.

Like the unfired green sheet 10 for the heater substrate 38, the unfired green sheet 10 for the solid electrolyte body 33 is adjusted to have pores with porosity greater than 5%. In addition, the unfired green sheet 10 may be preferably structures to have porosity greater than 10% and, more preferably, 15%.

To this end, the unfired green sheet 10 for the solid electrolyte body 33 is pressurized with a pressure greater than 10 MPa at a temperature above 60° C. in the same method in which the unfired green sheet 10 for the heater substrate 38 is pressurized.

The unfired green sheet 10 for the solid electrolyte body 33 is subjected to the pressurization under the condition set forth above with porosity less than 7.5%.

Subsequently, an electrically conductive paste is printed on the surface 100 of the unfired green sheet 10 for the solid electrolyte body 33 in areas for the measuring gas side electrode 34, the reference gas side electrode 35, the lead portions 341, 351 and the terminal portions 342, 352, 353, respectively.

Further, an insulating paste is formed on the one surface 100 of the unfired green sheet 10 for the solid electrolyte body 33 in other areas, where no conductive paste layer formed for the measuring gas side electrode 34 is present, by printing a reverse pattern with the same thickness as that of the conductive paste layer for the measuring gas side electrode 34. This eliminates a difference in level on the one surface 100 of the unfired green sheet 10 with respect to the conductive paste layer for the measuring gas side electrode 34. Subsequently, the resulting unfired green sheet 10 is dried.

Furthermore, examples of electrically conductive paste for the measuring gas side electrode 34 and the reference gas side electrode 35 may include a raw material, containing, for instance, 2.9 g of zirconium powder and 20 g of platinum, and a given amount of a mixed solvent, containing a binder and a solvent or the like, which is mixed to the raw material.

Moreover, examples of electrically conductive paste for the lead portions 341, 351 and the terminal portions 342, 352, 353 may include a raw material, containing, for instance, 1.6 g of zirconium powder and 20 g of platinum, and a given amount of a mixed solvent, containing a binder and a solvent or the like, which is mixed to the raw material.

Next, a description is made of a method of manufacturing the porous diffusion resistance layer 32.

The porous diffusion resistance layer 32 is fabricated using a ceramic powder. For the ceramic powder, one alumina powder in the form of the ceramic particles 11 with an average particle diameter of 0.3 μm and a tap density of 1.4 g/cc and another alumina powder with an average particle diameter of 0.4 μm and a tap density of 0.81 g/cc are blended and mixed in a blending ratio of 1:9 to provide 100 g of mixed alumina powder. Then, 22 g of butyral resin serving as the binder 12, 8 g of butyl benzyl phthalate serving as the plasticizer 13, 2 g of sorbitan trioleate as the dispersant, and a given amount of mixed solvent containing ethanol, 2-butanol and isoamyl acetate are added to 100 g of mixed alumina powder and wet blended, thereby preparing a slurry. By using this slurry, the unfired green sheet 10 for the porous diffusion resistance layer 32 is fabricated for the heater substrate 38 by, for instance, a doctor blade method.

Further, the unfired green sheet 10 for the shielding layer 31 can be manufactured in the same method as that in which the unfired green sheet 10 for the heater substrate 38 is manufactured.

As set forth above, with the respective layers being completely manufactured, these layers are stacked in a manner described below.

First, the heating layer 380 and the reference gas airspace forming layer 36 are unitized by thermal compression bonding, thereby providing a first unitized body.

Further, the sensing layer 330, the porous diffusion resistance layer 32 and the shielding layer 31 are unitized by thermal compression bonding, thereby providing a second unitized body.

Then, the resulting first unitized body, composed of the heating layer 380 and the reference gas airspace forming layer 36, the sensing layer 330, and the resulting second unitized body, composed of the sensing layer 330, the porous diffusion resistance layer 32 and the shielding layer 31, are stacked, upon which the first and second unitized bodies are bonded to each other by adhesive.

With such a sequence mentioned above, a stacked ceramic body is obtained including the shielding layer 31, the porous diffusion resistance layer 32, the sensing layer 330, the reference gas airspace forming layer 36 and the heating layer 380.

Finally, the stacked ceramic body is fired at a maximal temperature ranging from 1400 to 1550° C., thereby obtaining the gas sensing element 3 shown in FIG. 2.

Although the present invention has been described with reference to an exemplary case of the gas sensing element 3 and the related manufacturing method, particular arrangements disclosed are meant to be illustrative only and not limiting the scope of the invention.

Next, various advantageous effects of the present embodiment will be described below.

The unfired green sheet 10, used in the present embodiment, is formed with porosity higher than 5%, making it possible to minimize a change in dimension of the unfired green sheet 10. This mechanism seems to come from two reasons. That is, first, with the unfired green sheet 10 having the pores with large porosity as high as 5%, even if the solvent of the paste penetrates the unfired green sheet 10, the solvent can escape to the outside through pores 14 present in the unfired green sheet 10. This provides an ease of drying the unfired green sheet 10. It is thus conceived that such a phenomenon precludes the binder 12 or the plasticizer 13 from dissolving for thereby precluding the rearrangement of the ceramic particles 11 in the ceramic powder.

Second, there are conditions under which the unfired green sheet 10 has the pores with porosity greater than 5%. These conditions seem to be involved in the following cases including: (1) a first case in which the ceramic particles 11 have a large particle diameter; (2) a second case in which the ceramic particles 11 agglutinate; and (3) a third case in which the ceramic particles 11 have complicated configurations.

Under such conditions, in usual practice, the ceramic particles 11 are arranged in a status with the particles agglutinating in a distance narrowed to some extent on a stage in which the unfired green sheet 10 is formed. Therefore, even if the rearrangement occurs in the ceramic particles 11, the distance between the particles is hard to be narrowed. Thus, even if the binder 12 or the like are dissolved due to the solvent, no dimensional change occurs in the unfired green sheet 10.

However, in a fourth case, the ceramic particles 11 have a small average particle diameter with well-regulated shapes (in the form of, for instance, a contoured shape closer to spheres). In this case, the porosity becomes small on a stage of the unfired green sheet 10. This causes the rearrangement of the ceramic particles 11 to easily occur during the dissolving of the binder 12 or the like. This results in a consequence of the unfired green sheet 10 being dried with the rearrangement caused in the ceramic particles 11, causing an increase in dimensional change.

As set forth above, with the unfired green sheet 10 having the large porosity, that is, a porosity exceeding a value of 5%, no need arises for choosing a solvent, while making it possible to eliminate the occurrence of a change in dimension of the unfired green sheet 10.

Also, it will be appreciated that the illustrative view of FIG. 1, showing a status of the unfired green sheet 10, represents one exemplary case representing a status of the second case (2) described above.

Further, the unfired green sheet 10 is pressurized at a temperature of 60° C. under the pressure greater than a value of 10 MPa after which the paste is printed on the surface 100 of the unfired green sheet 10, enabling the unfired green sheet 10 to be hardened with increased density. This adequately prevents a solvent in the paste from permeating into the unfired green sheet 10.

Furthermore, with the unfired green sheet 10 pressurized under the condition mentioned above, the unfired green sheet 10 has porosity less than 7.5%. This enables the unfired green sheet 10 to be less liable to suffer from dimensional variation, making it possible to obtain the ceramic sheet 1 with further increased dimensional precision. In addition, the ceramic sheet 1 forms a part of the gas sensing element 3 for detecting a specified gas concentration of measuring gases. In this case, the gas sensing element 3 can employ the ceramic sheet with an increased precision in dimension, making it possible to obtain the gas sensing element 3 with high reliability.

Moreover, the unfired green sheet 10 has a structure in that the unfired green sheet 10 has a less dimensional change, even if the paste is repeatedly printed on the surface 100 and dried multiple times, than that of the unfired green sheet 10 rendered to have the porosity less than 5%. This enables the ceramic sheet 1 to be obtained with a further increase in dimensional precision.

As set forth above, with the present embodiment, it becomes possible to provide a method of manufacturing a ceramic sheet with less variation in dimension and no need for preliminarily selecting a solvent.

(First Tests)

Tests were conducted on the unfired green sheets 10 to check dimensional change rates of the unfired green sheets 10 with substantial volume ratios varied in different parameters.

That is, a paste was prepared containing an alumina powder serving as a ceramic powder, terpineol serving as a solvent, and a binder. Then, the paste was printed on the surfaces 100 of the unfired green sheets 10 with the substantial volume ratios varied in different parameters. Thereafter, the unfired green sheets 10 were dried, thereby obtaining specimens. Subsequently, the unfired green sheets 10 of the specimens, after the printing step, were measured to check the dimensional change rates of the unfired green sheets 10 in contrast to those of the unfired green sheets 10 before the paste was printed.

Further, as used herein, the term "substantial volume ratio" refers to a value representing a ratio obtained by dividing a sum of a volume of an organic matter such as the binder or the like and a volume of the ceramic powder by an entire volume of the unfired green sheets 10. Then, the porosity can be calculated based on the resulting volume ratios using a formula (1) expressed below.

$$(Porosity) = 100(\%) - (Substantial\ Volume\ Ratio) \quad (1)$$

Further, it will be appreciated that like reference characters used in the present tests designate like or corresponding parts used in the embodiment shown in FIG. 1.

Figure 3:
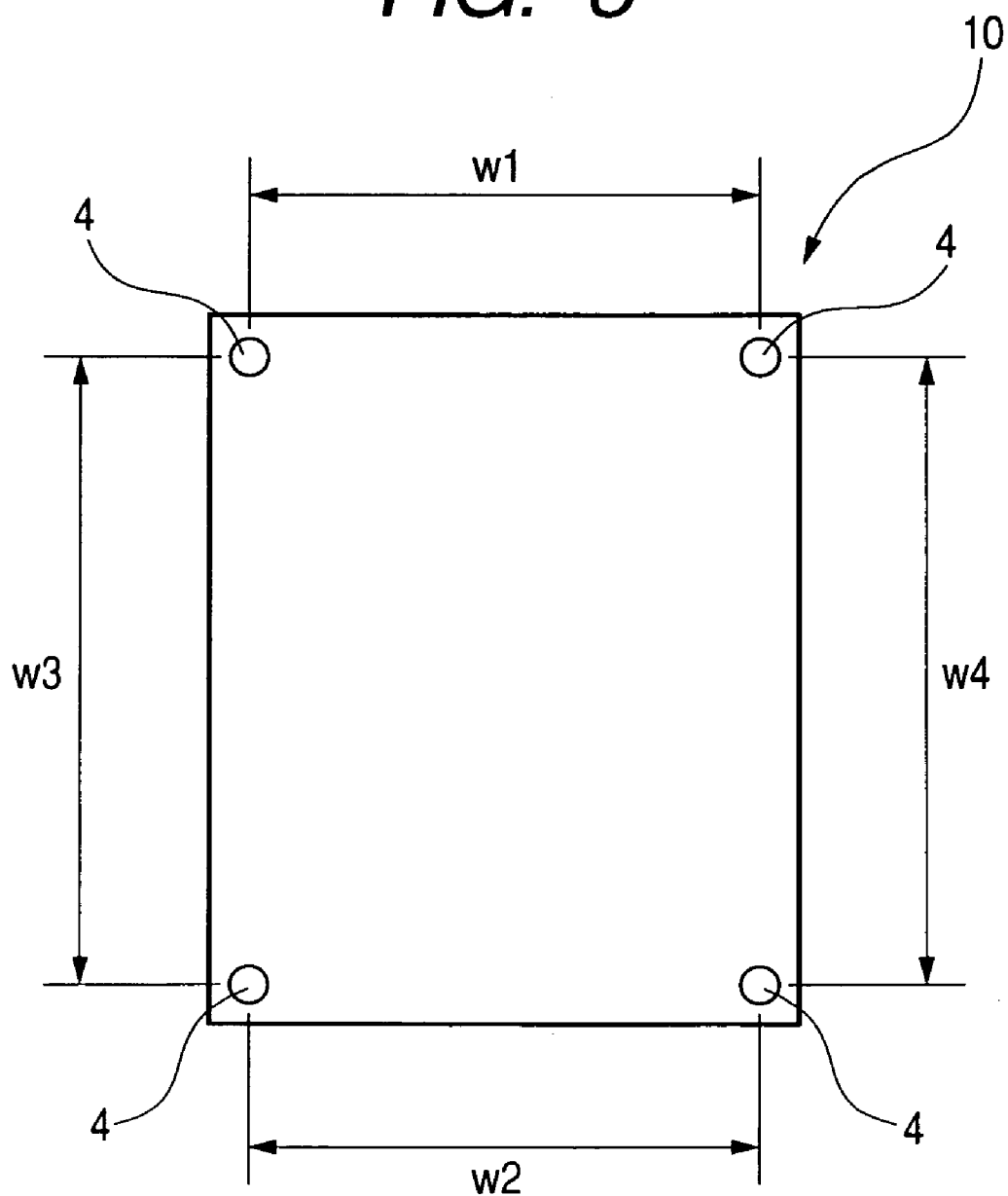
FIG. 3 is a top view of an unfired green sheet prepared for testing a dimensional change.

In measuring the specimens during the present tests, first, the unfired green sheet 10 was prepared with four corners formed with pinholes 4, respectively, as shown in FIG. 3. Then, distances w1 to w4 between centers of the pinholes 4 for upper, lower, left and right sides of the unfired green sheet 10 were measured. Next, an electrically conductive paste was printed on the surface 100 of the unfired green sheet 10 in one area. Thereafter, an insulating paste is formed on the surface 100 of the unfired green sheet 10 in the other area, in which no conductive paste was present, by printing a reverse pattern with the same thickness as that of the conductive paste. The insulating paste was printed three times. Printing such insulting paste on the surface 100 of the unfired green sheet 10 in the other area thereof minimized an uneven stepped portion caused by the electrically conductive paste printed in advance.

Subsequently, a whole of the unfired green sheet 10 was dried at a temperature of 55° C. for 20 minutes. Thereafter, the center distances w1 to w4 between the pinholes 4 were measured again, thereby measuring the dimensional change of the unfired green sheet 10 after the printing of the paste.

The dimensional change rate of the unfired green sheet 10 for each of the upper, lower, left and right sides of the unfired green sheet 10 was calculated based on the dimensions between the pinholes 4 before the paste was printed and the dimensions between the pinholes 4 after the paste was printed.

Figure 4:
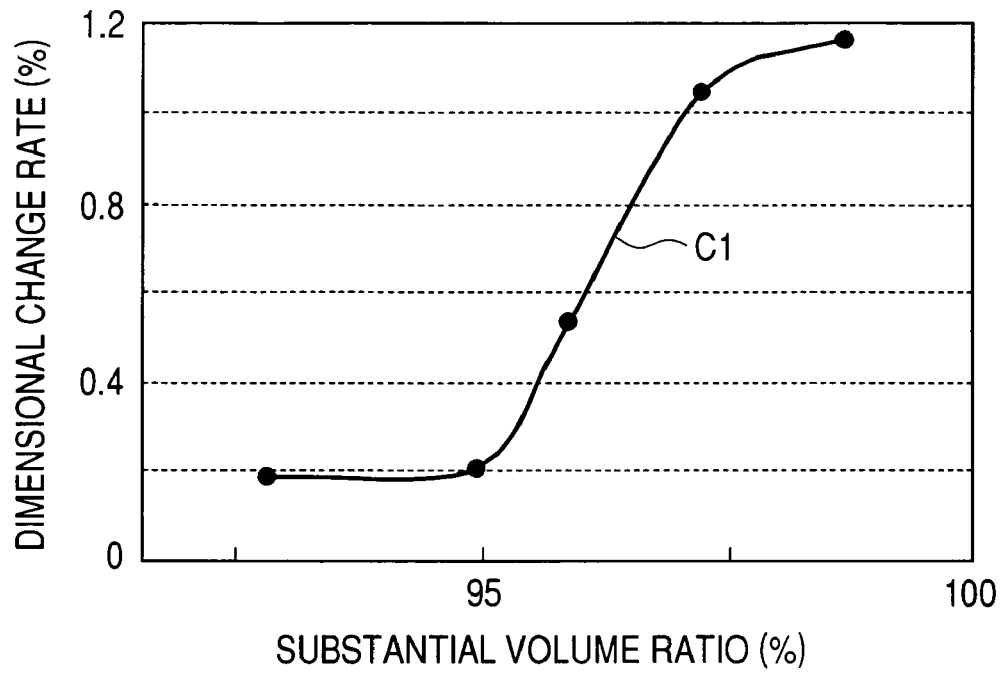
FIG. 4 is a graph showing the relationship between a relative density and a dimensional change rate of the unfired green sheet.

FIG. 4 shows variation in dimensional change rate (%) in terms of the substantially volume ratio (%) with the dimensional change rate plotted in values obtained upon calculating the dimensional change rates of the unfired green sheet 10 on each of the respective sides thereof and subsequently calculating an average value of the dimensional change rates on each side.

The test results are shown in FIG. 4.

As shown by a curve C1 in FIG. 4, as the unfired green sheet 10 has a relative density exceeding a value of 95% (that is, with porosity less than 5%), the dimensional change rate of the unfired green sheet 10 after the printing of the paste lies at a substantially low level less than approximately 0.2%.

Meanwhile, as will be apparent from FIG. 4, as the unfired green sheet 10 has the relative density greater than 95%, that is, with the porosity less than 5%, the dimensional change rate of the unfired green sheet 10 rapidly increases.

As will be apparent from the foregoing, with the unfired green sheet 10 having the relative density less than 95%, that is, with the porosity greater than 5%, the dimensional change of the unfired green sheet 10 after the printing of the paste can be adequately suppressed.

(Second Tests)

Second tests were conducted on the unfired green sheets 10 to check the dimensional change rates of the unfired green sheets 10 that were formed upon varying the temperature and pressure under which the unfired green sheets 10 were pressurized. That is, with the present tests, the temperatures were varied in value from 0 to 100° C. with the pressures varied in value from 0 to 49 MPa. The unfired green sheets 10 were placed and pressurized in the WIP device.

Figure 5:
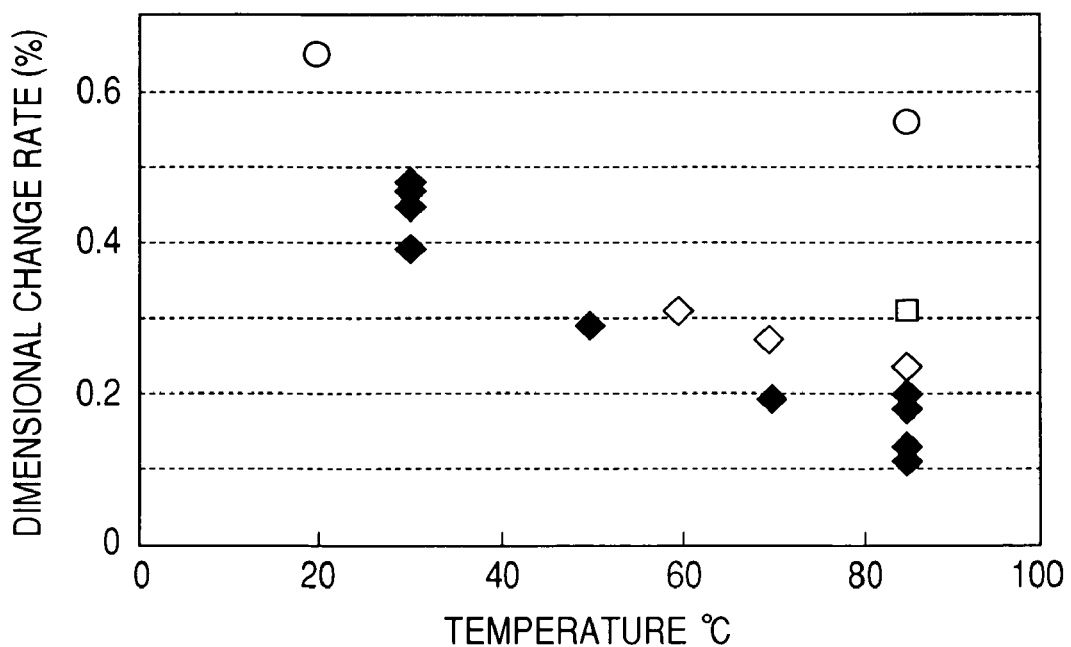
FIG. 5 is a graph showing the relationship between a pressurizing condition and a dimensional change rate of the unfired green sheet.

FIG. 5 shows the representation of the dimensional change rate (%) in terms of the temperature (° C.). In FIG. 5, empty circles "○" represent the dimensional change rate with the pressurization executed at a pressure of 0 MPa. An empty box "□" represents the dimensional change rate with the pressurization executed at a pressure of 2 MPa. Empty boxes "◇" represent the dimensional change rate with the pressurization executed at a pressure of 8 MPa. Filled boxes "◆" represent the dimensional change rate with the pressurization executed at pressures ranging from 10 to 49 MPa. FIG. 5 shows a graph representing the dimensional change rates (%) of the unfired green sheets 10 plotted in terms of the respective temperature conditions.

The present tests were conducted on the same other conditions as those of the unfired green sheet 10 on which the first tests were conducted.

Further, it will be appreciated that like reference characters used in the present tests designate like or corresponding parts used in the embodiment shown in FIG. 1.

The test results are shown in FIG. 5.

As will be apparent from the graph of FIG. 5, with the unfired green sheet 10 pressurized with the pressure greater than 10 MPa at the temperatures above 60° C., the unfired green sheets 10 had the dimensional change rate that was sufficiently less than 0.2% with a further decrease in dimensional change.

Meanwhile, as will be apparent from the graph of FIG. 5, further, with the unfired green sheet 10 pressurized with the pressure lower than 10 MPa at the temperatures below 60° C., the unfired green sheet 10 had the dimensional change rate that was greater than 0.2% with the resultant difficulty of achieving an adequate reduction in dimensional change.

As will be turned out from the foregoing, the unfired green sheet 10 is preferable to be pressurized with the pressure above 10 MPa at the temperatures above 60° C.

(Third Tests)

Third tests were conducted on the unfired green sheets 10 to check variations in dimensional change rates of the unfired green sheets 10 with the paste printed multiple times in one case (hereinafter referred to as "in the presence of WIP") where the unfired green sheet 10 was pressurized with the pressure of 50 MPa at the temperature of 850° C. and in the other case (hereinafter referred to as "in the absence of WIP") where the unfired green sheet 10 was not pressurized.

Figure 6:
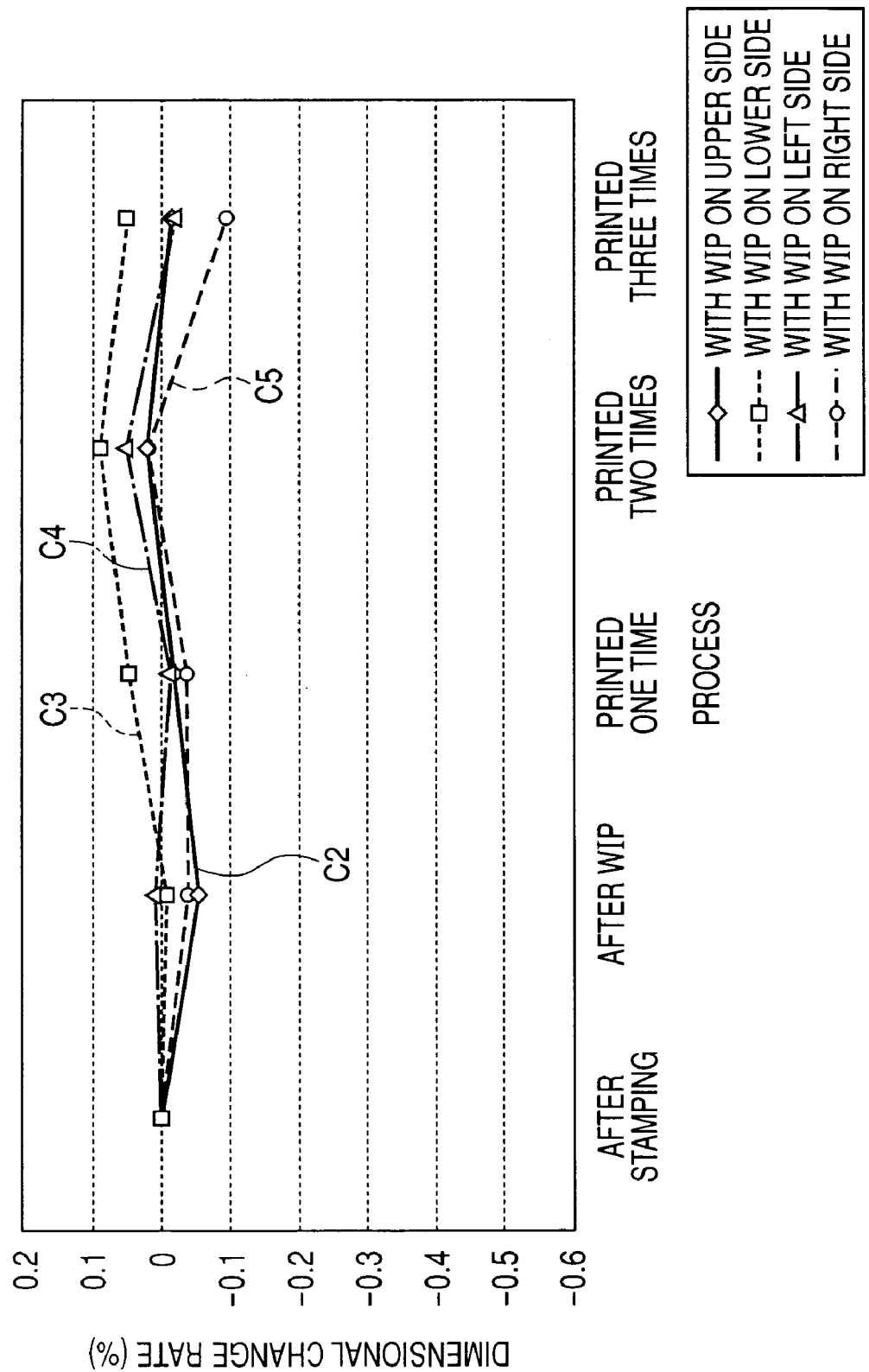
FIG. 6 is a graph showing a transition in dimensional change rate of the unfired green sheet in the presence of WIP.

In FIG. 6, a curve C2 is plotted with empty boxes "◊" representing variation in dimensional change rate (%) of the unfired green sheet 10 calculated on the parameter of the dimension w1 (on the upper side of the unfired green sheet 10) before and after the paste is printed in the presence of WIP. A curve C3 is plotted with empty boxes "□" representing variation in dimensional change rate (%) of the unfired green sheet 10 calculated on the parameter of the dimension w2 (on the lower side of the unfired green sheet 10) before and after the paste is printed in the presence of WIP. A curve C4 is plotted with empty triangles "Δ" representing variation in dimensional change rate (%) of the unfired green sheet 10 calculated on the parameter of the dimension w3 (on the left side of the unfired green sheet 10) before and after the paste is printed in the presence of WIP. A curve C5 is plotted with empty circles "○" representing variation in dimensional change rate (%) of the unfired green sheet 10 calculated on the parameter of the dimension w4 (on the right side of the unfired green sheet 10) before and after the paste is printed in the presence of WIP.

Figure 7:
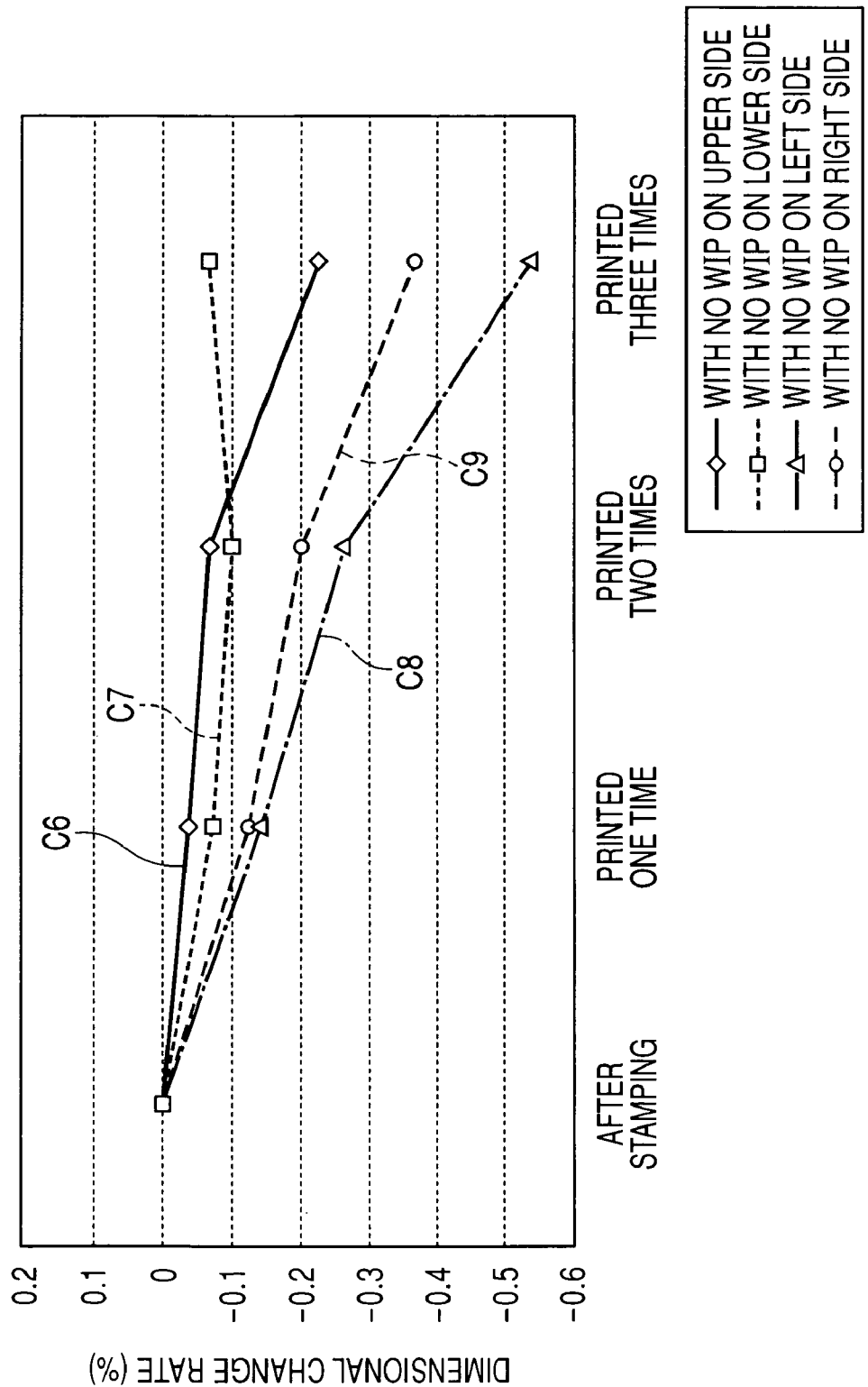
FIG. 7 is a graph showing a transition in dimensional change rate of the unfired green sheet in the absence of WIP.

In FIG. 7, a curve C6 is plotted with empty boxes "◊" representing variation in dimensional change rate (%) of the unfired green sheet 10 calculated on the parameter of the dimension w1 (on the upper side of the unfired green sheet 10) before and after the paste is printed in the absence of WIP. A curve C7 is plotted with empty boxes "□" representing variation in dimensional change rate (%) of the unfired green sheet 10 calculated on the parameter of the dimension w2 (on the lower side of the unfired green sheet 10) before and after the paste is printed in the absence of WIP. A curve C8 is plotted with empty triangles "Δ" representing variation in dimensional change rate (%) of the unfired green sheet 10 calculated on the parameter of the dimension w3 (on the left side of the unfired green sheet 10) before and after the paste is printed in the absence of WIP. A curve C9 is plotted with empty circles "○" representing variation in dimensional change rate (%) of the unfired green sheet 10 calculated on the parameter of the dimension w4 (on the right side of the unfired green sheet 10) before and after the paste is printed in the absence of WIP.

The present tests were conducted under the same other conditions as those of the unfired green sheets 10 subjected to the second tests mentioned above.

The test results are plotted in FIGS. 6 and 7.

As will be apparent from the graph of FIG. 6, with the one case in the presence of WIP, the unfired green sheet 10 had the dimensional change rate of ±0.1% even when the paste was printed multiple times. Thus, the dimensional change was adequately suppressed.

On the contrary, as will be understood from FIG. 7, with the other case in the absence of WIP, the unfired green sheet 10 had the dimensional change rate having an absolute value increasing with an increase in the number of times the paste was printed. That is, with the other case in the absence of WIP, it will be turned out that if the paste is printed multiple times, then, a difficulty is encountered in adequately maintaining the unfired green sheet 10 in a given dimension.

(Third Aspect of the Invention)

A method of manufacturing an unfired green sheet with porosity greater than 5% of a third aspect of the present invention will be described below.

With the third aspect of the present invention, the method of manufacturing an unfired green sheet includes the steps of preparing a raw material containing a ceramic powder, a binder, a plasticizer and a solvent, mixing the raw material, and forming the resulting mixture in an unfired green sheet.

More particularly, in carrying out the method of manufacturing the unfired green sheet, a content of 7 to 9 wt % of the binder is weighed relative to the ceramic powder. The content of 7 to 9 wt % of the binder lies at a small value equal to about three-fourth of, for instance, a binder contained in a raw material prepared for fabricating an unfired green sheet of the related art.

With the third aspect of the present invention, further, a given amount of the binder, the plasticizer and the solvent are added to the ceramic powder to provide a mixture. The resulting mixture is then mixed for 4 to 8 hours. The mixing time interval of 4 to 8 hours lies at a lessened value equal to a value of, for instance, about one-sixth to one-tenth of a time interval for which a blend of a ceramic powder, a binder, a plasticizer and a solvent is mixed in fabricating an unfired green sheet of the related art.

Although adjusting the content of the binder and adjusting the mixing time interval enables an unfired green sheet to be easily formed with porosity greater than 5%, even performing one of these two adjustments enables the unfired green sheet to be easily formed with porosity greater than 5%.

If the mixing time interval lies at a value less than 4 hours or if the binder has the content less than 7 wt %, then, there is a fear of a difficulty arising in adequately mixing the ceramic powder and the binder. This results in a fear of cracking occurring in a ceramic sheet.

Further, if the mixing time interval exceeds 8 hours or the binder has the content greater than 9 wt %, then, there is a fear of a difficulty arising in forming an unfired green sheet with an adequate amount of pores. This results in a fear of a difficulty arising in forming the unfired green sheet with an adequate increase in porosity.

(Fourth Tests)

Tests were conducted on the unfired green sheets 10 to check dimensional change rates of the unfired green sheets 10 on a stage before and after the paste has been printed with porosity of the unfired green sheets 10 varied in different parameters.

Figure 8:
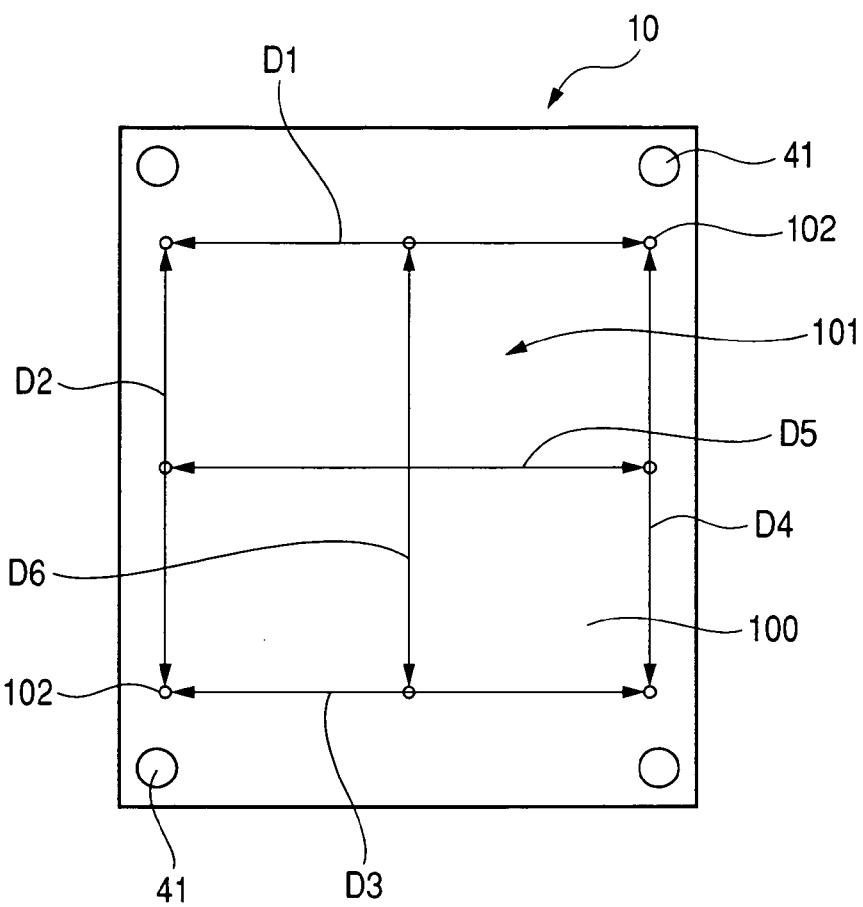
FIG. 8 is a top view of an unfired green sheet prepared by the method of manufacturing a ceramic sheet of the present invention.

In measuring the dimensional change rates of the unfired green sheets 10, first, square-shaped unfired green sheets 10 were fabricated with four corners of each unfired green sheet 10 being clamped by pins 41, respectively. Each unfired green sheet 10 had a surface 10a in which a print object area 101 is partially defined within an area formed in the square shape with apexes on the four pins 41 while having eight measuring points 102 set in positions as shown in FIG. 8. Among these measuring points 102, measuring points 102 in a pair are connected to each other with lengths of six line segments, extending parallel to sides of each unfired green sheet 10, being measured, respectively. That is, distances D1 to D6 were measured as lengths of the six line segments, respectively, as shown in FIG. 8.

Then, electrically conductive paste was printed on the surface 10a in an area surrounded with the pins 41.

Thereafter, a reverse pattern printing was conducted to form insulating paste on the surface of each unfired green sheet 10 in an area, where no electrically conductive paste was printed, so as to have the same film thickness as that of the electrically conductive paste. This minimized an uneven stepped portion caused by the electrically conductive paste printed in advance. In addition, the electrically conductive paste and the insulating paste were printed four times, respectively.

Subsequently, a whole of each unfired green sheet 10 was dried at a temperature of 55° C. for 20 minutes.

Thereafter, the lengths (D1 to D6) of the six line segments were measured again, thereby checking the dimensional change in the unfired green sheets 10 on a stage subsequent to the paste printing.

Figure 9:
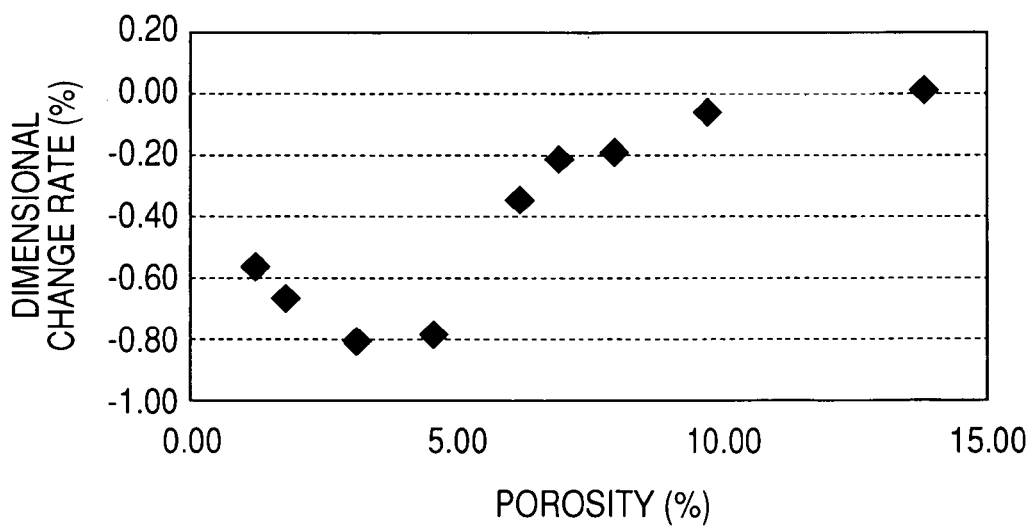
FIG. 9 is a graph showing the relationship between a porosity and a dimensional change rate.
Figure 10A:
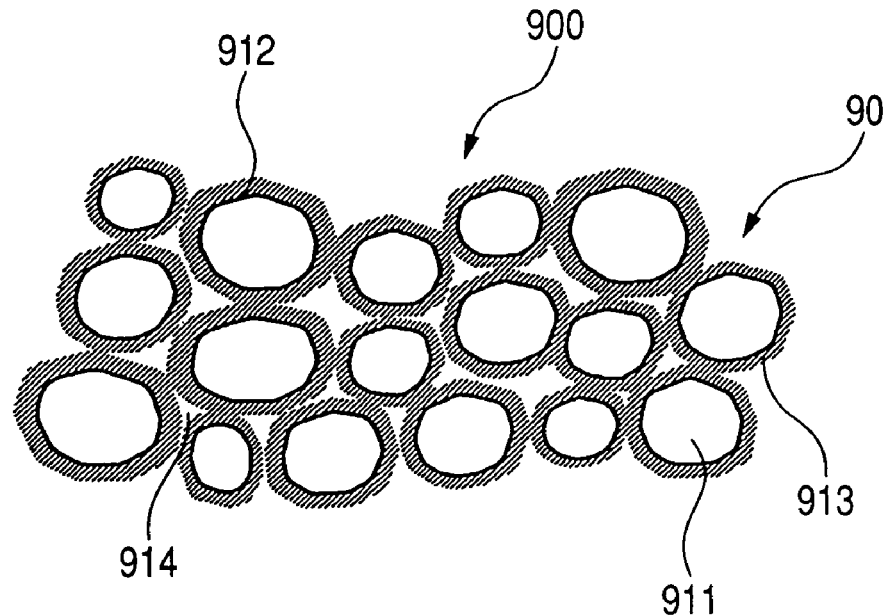
FIG. 10A is an enlarged illustrative view showing a structure of an unfired green sheet of the related art before a paste is printed thereon.
Figure 10B:
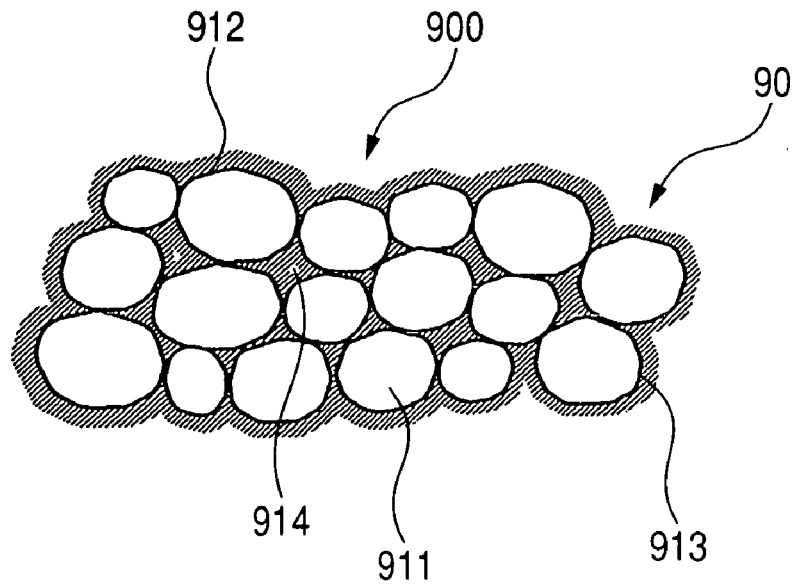
FIG. 10B is an enlarged illustrative view showing a structure of an unfired green sheet of the related art after a paste is printed thereon.

Then, a dimensional change rate of each unfired green sheet 10 in the six measuring points were calculated based on the distance prior to the printing with paste and the distance subsequent to the printing with paste. FIG. 9 shows the dimensional change rate representing a value obtained by a process in which the dimensional change rates on lengths (D1 to D6) of the six line segments of each unfired green sheet 10 were calculated after which an average value on the dimensional changes rates on all the distances for the lengths (D1 to D6) was calculated.

Measured results are indicated in FIG. 9. The porosity, plotted on the abscissa of FIG. 9, represents porosity of each unfired green sheet 10 on a stage prior to the pressurization being conducted.

As will be apparent from FIG. 9, with the unfired green sheet 10 having porosity greater than 10%, the unfired green sheet 10 exhibited the dimensional change rate laying at a value of nearly 0% on a stage before and after the printing with paste, enabling the dimensional change rate to be reduced to an adequately minimized level. In addition, it is turned out that with the unfired green sheet 10 having porosity greater than 15%, the dimensional change rate can be decreased to a further minimized extent.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A method of manufacturing a gas sensing element for detecting a specified gas concentration in measuring gases, comprising the steps of: preparing first to third unfired green sheets for a sensing layer, a reference gas airspace forming layer and a heating layer, respectively; pressuring the first to third unfired green sheets with a pressure of 10 MPa at a temperature above 60° C. such that each of the first to third unfired green sheets has porosity greater than 5% and less than 7.5%;

printing an electrically conductive paste on surfaces of the first unfired green sheet;

preparing the sensing layer by forming a measuring gas side electrode on one surface of the first unfired green sheet and forming a reference gas side electrode on the other surface of the first unfired green sheet;

preparing the reference gas airspace forming layer using the second unfired green sheet;

preparing the heating layer by forming a heating section on the third unfired green sheet at one surface thereof in face with the sensing layer;

stacking a shielding layer, a porous diffusion resistance layer, the sensing layer, the reference gas airspace forming layer and the heating layer to form a stacked ceramic body; and firing the stacked ceramic body for thereby obtaining the gas sensing element.

2. The method of manufacturing a gas sensing element according to claim 1, wherein:

the first to third unfired green sheets are prepared by the steps of: blending at least a ceramic powder, a binder and a plasticizer to prepare a mixture of raw materials;

mixing the raw materials; forming the first to third unfired green sheets; and drying the first to third unfired green sheets, respectively.

3. The method of manufacturing a gas sensing element according to claim 1, wherein:

each of the first to third unfired green sheets has a dimensional change less than that of another green sheet whose porosity lies at a value less than 5%.

4. The method of manufacturing a gas sensing element according to claim 1, wherein:

the step of pressuring the first to third unfired green sheets is conducted using a warm isostatic press.

5. The method of manufacturing a gas sensing element according to claim 2, wherein:

the raw materials further include a solvent to allow the raw materials to be mixed in a slurry.

6. The method of manufacturing a gas sensing element according to claim 2, wherein:

the binder includes butyral resin.

7. The method of manufacturing a gas sensing element according to claim 2, wherein:

the plasticizer includes butyl benzyl phthalate.

* * * * *